(12) United States Patent
Yueh

(10) Patent No.: US 8,880,797 B2
(45) Date of Patent: Nov. 4, 2014

(54) DE-DUPLICATION IN A VIRTUALIZED SERVER ENVIRONMENT

(75) Inventor: Jedidiah Yueh, Irvine, CA (US)

(73) Assignee: EMC Corporation, Hopkinton, MA (US)

( * ) Notice: Subject to any disclaimer, the term of this patent is extended or adjusted under 35 U.S.C. 154(b) by 898 days.

(21) Appl. No.: 11/864,756

(22) Filed: Sep. 28, 2007

(65) Prior Publication Data

US 2009/0063528 A1 Mar. 5, 2009

Related U.S. Application Data

(60) Provisional application No. 60/970,181, filed on Sep. 5, 2007.

(51) Int. Cl.
*G06F 12/08* (2006.01)
*G06F 3/06* (2006.01)
*G06F 17/30* (2006.01)

(52) U.S. Cl.
CPC ........ *G06F 17/30159* (2013.01); *G06F 3/0641* (2013.01); *G06F 3/0608* (2013.01)
USPC .................... 711/113; 711/203; 711/E12.016

(58) Field of Classification Search
CPC . G06F 3/0641; G06F 3/0608; G06F 17/3015; G06F 17/30156
See application file for complete search history.

(56) References Cited

U.S. PATENT DOCUMENTS

| | | | |
|---|---|---|---|
| 7,603,529 B1 | 10/2009 | MacHardy et al. | |
| 7,747,584 B1 * | 6/2010 | Jernigan, IV | 707/692 |
| 8,280,926 B2 * | 10/2012 | Sandorfi et al. | 707/812 |
| 2005/0044301 A1 * | 2/2005 | Vasilevsky et al. | 711/1 |
| 2007/0226444 A1 | 9/2007 | Yagawa | |
| 2007/0255758 A1 | 11/2007 | Zheng et al. | |

(Continued)

FOREIGN PATENT DOCUMENTS

| | | |
|---|---|---|
| KR | 10-2005-0088067 A | 9/2005 |
| KR | 10-2006-0042989 A | 5/2006 |
| KR | 10-2006-0044567 A | 5/2006 |
| KR | 10-2007-0086325 A | 8/2007 |

OTHER PUBLICATIONS

Bak Young Jim, Data Writing of Deduplication System, IT Business Leader's Magazine, Seoul:KyungCom, Jul. 2007, vol. 369, pp. 134-137.

(Continued)

*Primary Examiner* — Charles Rones
*Assistant Examiner* — Ryan Dare
(74) *Attorney, Agent, or Firm* — Workman Nydegger

(57) ABSTRACT

A data de-duplication application de-duplicates redundant data on the primary storage read/write pathway of a virtualized server environment. The virtualized server environment comprises one or more server applications operating on a virtualization layer provided on a computer architecture that includes memory (e.g., RAM, cache memory) for temporarily storing data and storage (e.g., disk storage) for persistently storing data. The one or more server applications use the read-write pathway to read data into memory from storage and to write data to storage from memory. The de-duplication application identifies redundant data in memory, storage, or both, and replaces the redundant data with one or more pointers pointing to a single copy of the data. The de-duplication application can operate on fixed or variable size blocks of data and can de-duplicate data either post-process or in-line.

20 Claims, 3 Drawing Sheets

(56) References Cited

U.S. PATENT DOCUMENTS

| | | | |
|---|---|---|---|
| 2008/0016131 A1* | 1/2008 | Sandorfi et al. | 707/204 |
| 2008/0098083 A1 | 4/2008 | Shergill et al. | |
| 2008/0184001 A1* | 7/2008 | Stager | 711/167 |
| 2008/0244172 A1* | 10/2008 | Kano | 711/112 |
| 2008/0282047 A1 | 11/2008 | Arakawa et al. | |
| 2009/0019246 A1* | 1/2009 | Murase | 711/162 |
| 2009/0063795 A1 | 3/2009 | Yueh | |

OTHER PUBLICATIONS

NETAPP White Paper, "Looking Beyond the Hype: Evaluating Data Deduplication Solutions", Larry Freeman, Network Appliance, Inc., Sep. 2007.

U.S. Appl. No. 11/864,583, Feb. 23, 2010, Office Action.

U.S. Appl. No. 11/864,583, Aug. 13, 2010, Final Office Action.

U.S. Appl. No. 11/864,583, May 17, 2011, Office Action.

U.S. Appl. No. 11/864,584, Mar. 2, 2012, Notice of Allowance.

* cited by examiner

DE-DUPLICATION IN A VIRTUALIZED SERVER ENVIRONMENT

CROSS-REFERENCE TO RELATED APPLICATIONS

The present application claims the benefit of U.S. Provisional Application Ser. No. 60/970,181, filed Sep. 5, 2007 and entitled DE-DUPLICATION IN A VIRTUALIZED SERVER ENVIRONMENT, which application is incorporated herein by reference in its entirety.

BACKGROUND OF THE INVENTION

1. The Field of the Invention

The present invention relates to data de-duplication. More particularly, embodiments of the invention relate to software, hardware, systems, and methods for de-duplicating redundant data in memory and storage of a virtualized server environment.

2. The Relevant Technology

Virtualization is an abstraction layer that decouples the physical hardware of a computer from the operating system ("OS") to deliver greater IT resource utilization and flexibility. Virtualization allows multiple virtual machines, with heterogeneous operating systems, to run in isolation, side-by-side on the same physical machine. Each virtual machine has its own set of virtual hardware (e.g., RAM, CPU, NIC, etc.) upon which an OS and applications are loaded. The OS sees a consistent, normalized set of hardware regardless of the actual physical hardware components.

Virtual machines are encapsulated into files, making it possible to rapidly save, copy, and provision a virtual machine. Full systems (fully configured applications, operating systems, BIOS and virtual hardware) can be moved, within seconds, from one physical server to another for zero-downtime maintenance and continuous workload consolidation.

Notwithstanding its many advantages, virtualization can result in the unnecessary short- and long-term storage of significant amounts of redundant data in memory (e.g., processor registers, cache memory, RAM, and the like) and primary storage (e.g., disk storage). For instance, to operate fifteen (or more) server applications as fifteen (or more) virtual machines in a virtual environment, fifteen (or more) separate operating systems have to be loaded into memory (e.g., a separate OS is loaded into the memory allocated to each virtual machine), even if two or more of the operating systems are identical and/or include identical data, files, executables, or the like. Similarly, fifteen separate operating systems have to be maintained in persistent/non-volatile storage (e.g., a separate OS is maintained in the storage allocated to each virtual machine). In each case, redundant instances of data occupy space in memory or storage which could be used for other data. Consequently, there currently exists a need in the art for data de-duplication solutions in virtualized server environments.

The subject matter claimed herein is not limited to embodiments that solve any disadvantages or that operate only in environments such as those described above. Rather, this background is only provided to illustrate one exemplary technology area where some embodiments described herein may be practiced

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

Figure 1:
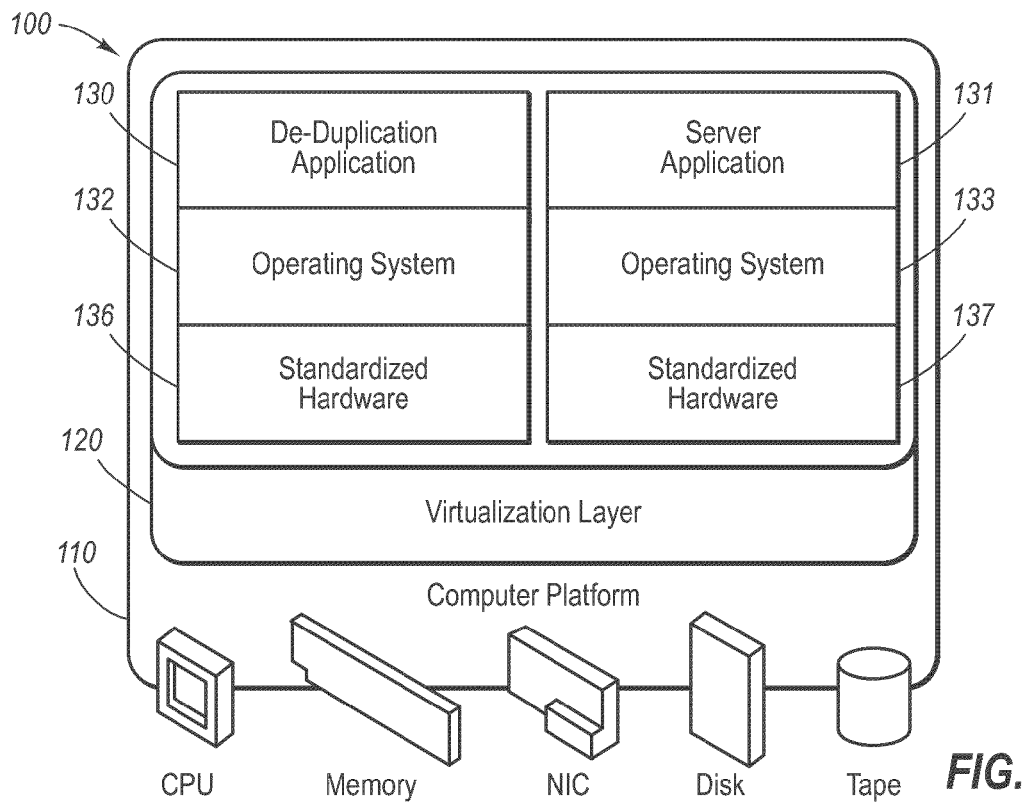
FIG. 1 illustrates a virtualized server environment within which a data de-duplication application can be implemented according to an embodiment of the invention using a virtualization layer to separate the de-duplication application, a server application, and associated operating systems from a computer architecture.

Embodiments of the invention relate to a data de-duplication application that de-duplicates redundant data on the primary storage (or simply "storage") read/write pathway of a virtualized server environment. As used herein, "primary storage" or "storage" refers to hard disk and other persistent storage wherein primary copies of data, such as files and executables, are stored. Prior to being operated on or processed, data from primary storage is read into memory where it can be accessed by a processor such as a central processing unit ("CPU"). As used herein, "memory" refers to processor registers, cache memory, random access memory ("RAM") and other temporary memory that can be quickly accessed by a computer's processor. It is understood that access speeds for memory are usually orders of magnitude greater than access speeds for storage. New and altered data generated by the processor upon operating on and processing data in the memory is typically first stored in memory and then written from memory to storage for persistent storing.

A computer environment including memory for the temporary storage of data and disk or other storage for the persistent storage of data is virtualized by providing an abstraction or virtualization layer on the computer environment. One or more server applications are operated on the virtualization layer, each configured to read data from storage into memory and to write data from memory to storage during operation. The virtualization layer presents a representation of resources (such as memory, storage, and the like) within the computer environment to the server applications. Each server application is encapsulated within a virtual machine and provided with an OS to manage corresponding virtualized hardware and software resources presented to each server application.

A data de-duplication application is operated in the computer environment to reduce redundant data in memory and/or storage. The de-duplication application identifies redundant data and replaces it with a reference and/or pointers to a copy of the data that is already present in the memory or storage. For instance, if the OSes used by each of the server applications are identical, a single instance of the OS can be stored in memory when the server applications are booted and the OS for each is loaded. In this case, redundant copies of the OS can be replaced by pointers that point to a single copy of the OS in memory. Similarly, when redundant data is written to storage, the redundant data can be replaced with pointers that point to a single instance of the data in storage. The de-duplication application can perform de-duplication in-line or post process.

By de-duplicating data on the storage read/write pathways, more data can be read from relatively slow-access storage into relatively fast-access memory. With the increased amount of data that can be represented in the relatively fast-access memory, access speeds are improved. Additionally, fewer input/output ("I/O") operations to the storage are required to access data since more data can be stored in memory. Further, processing overhead in storage implemented as a Storage Area Network ("SAN") and the like is improved when data written to the storage is de-duplicated inline since less data is written to the storage.

To practice the invention, the computer and network devices may be any devices useful for providing the described functions, including well-known data processing and storage and communication devices and systems such as computer devices typically used as hosts in user systems with processing, memory, and input/output components, and server devices configured to maintain and then transmit digital data over a communications network. Data typically is communicated in digital format following standard communication and transfer protocols. The data storage resources are generally described as disk, optical, and tape devices that implement RAID and other storage techniques and that may use SCSI and other I/O, data transfer, and storage protocols, but the invention is not intended to be limited to the example embodiments or to specific hardware and storage mechanisms as it is useful for nearly any computer environment.

FIG. 1 illustrates one embodiment of a virtualized system 100 in which embodiments of the invention may be implemented. As shown, the virtualized system 100 is built on a computer platform 110 (e.g., the x86 computer architecture or the like) that includes a number of resources such as CPUs, memory, network devices, disk, and tape mechanisms. A virtualization layer 120 is provided to manage access to or "virtualize" the architecture 110 into a uniform pool and separate the hardware of this pool from one or more virtual machines (i.e., the system 100 is shown with 2 such virtual or guest machines running on the virtualization layer 120—but more such machines may be run). The virtualization layer 120 presents a virtualized representation 136, 137 to an OS 132, 133 of each virtual or guest machine. The operating systems 132, 133 may be the same or vary and may include for example, Windows, Linux, Novell, Solaris, and other operating systems such as FreeBSD and the like.

A server application 131 is provided and associated with the OS 133 and uses the virtual system 137 to read data into memory from storage and/or to write data to storage from memory. The virtual system 137 shields the server application 131 from the actual resources 110, presenting, for instance, a logical representation of all or a portion of the memory and all or a portion of the disk storage to the server application. While the virtualized system 100 is illustrated with a single server application 131 running on the virtualization layer 120, in another embodiment of the invention the virtualized system may have a plurality of server applications 131 running on the virtualization layer 120, each provided with an OS 133 and standardized hardware 137.

Additionally, a data de-duplication application 130 is provided and associated with the OS 132 and uses the virtual system 136 to process data read into memory or written to disk storage to eliminate redundant data within the memory or disk storage, respectively, of the resource pool 110. The de-duplication application 131 can be virtually any de-duplication application configured to identify redundant data and replace the redundant data with one or more pointers or references pointing to a single instance of the data. For instance, in one embodiment of the invention the de-duplication application 131 de-duplicates data in-line. In other words, the de-duplication application identifies and replaces redundant data with pointers as data is ingested, read, or written into memory or storage. According to another embodiment of the invention, the de-duplication application 131 de-duplicates data post-process. In this example, the de-duplication application identifies and replaces redundant data with pointers after the data has already been ingested, read, or written into memory or storage. Additionally, the de-duplication application can de-duplicate data using a fixed block size or a variable block size. While many data de-duplication algorithms are known in the art and can be implemented by the de-duplication application 130, in one embodiment the de-duplication application implements the sticky byte algorithm disclosed in commonly assigned U.S. Pat. No. 6,810,398, which is incorporated herein by reference.

Generally, the virtualization layer 120 is selected to act as an abstraction layer that decouples the physical hardware from the OS associated with applications 130, 131 to deliver greater IS resource utilization and flexibility. Virtualization layer 120 allows multiple virtual machines or guest machines (such as may be used to run applications 130, 131), with homogeneous or heterogeneous operating systems, to run in isolation but side-by-side on the same or a different physical machine. Each virtual machine has its own set of virtual hardware (e.g., RAM, CPU, NIC, etc. within the pool 110) upon which an OS and applications including the applications 130, 131 are loaded. The operating systems see a consistent, normalized set of hardware regardless of the actual physical hardware components.

Advantageously, virtual machines (such as the two virtual machines of FIG. 1) can be encapsulated into files, making it possible to rapidly save, copy and provision a virtual machine. Full systems (fully configured applications, operating systems, BIOS and virtual hardware) can be moved, within seconds, from one physical server to another for zero-downtime maintenance and continuous workload consolidation. Additionally, the virtualization layer 120 provides isolation. Virtual machines are completely isolated from the physical host machine and other virtual machines. If a virtual machine crashes, all others are unaffected. Data does not leak across virtual machines and applications can only communicate over configured network connections.

Figure 2:
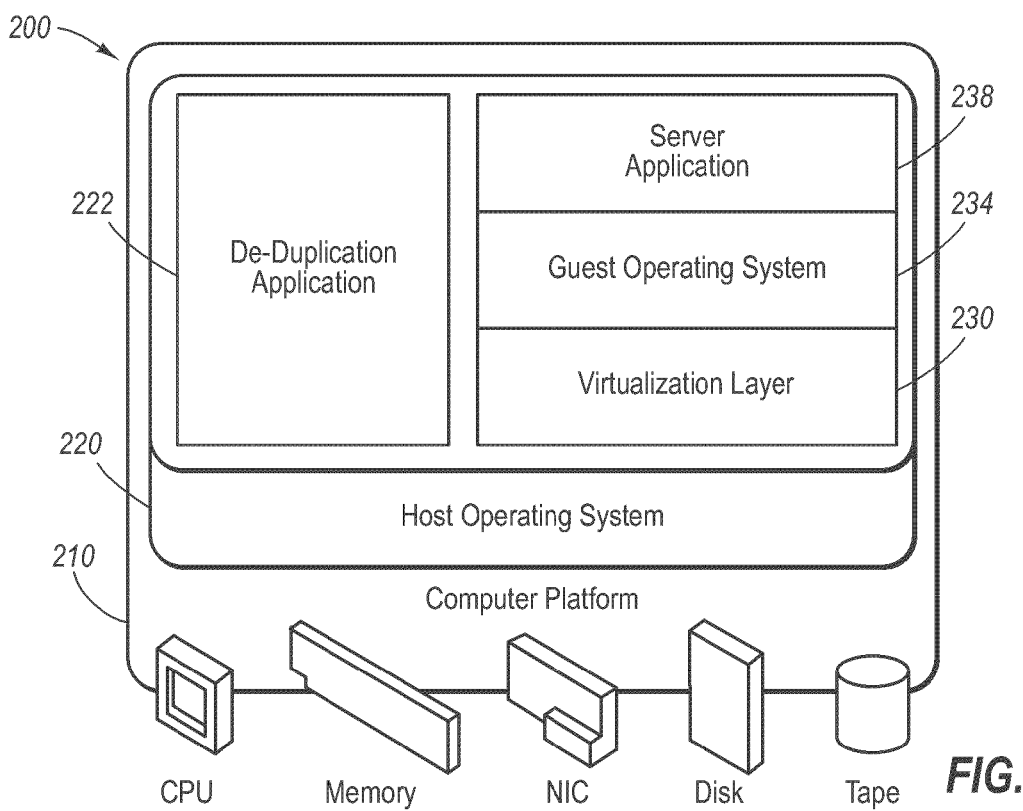
FIG. 2 illustrates another virtualized server environment that is similar to that of FIG. 1 but arranged as a hosted architecture wherein a data de-duplication application is not virtualized.

FIG. 2 illustrates an alternative arrangement for a virtualized system 200 according to the invention. As with system 100, the system 200 includes a set of computer hardware or a particular architecture 210. In this example, a de-duplication application 222 is installed and run in the architecture 210 as a conventional application, relying on a host OS 220 for device support and physical resource management of the architecture 210. The system 200 additionally includes a virtual machine that is installed and run as an application, e.g., similar to application 222. The virtual machine includes the virtualization layer 230 that shields a server application 238 within the virtual machine from the computer resources 210. As with the application 222, the virtualization layer 230 relies on the host OS 220 for device support and physical resource management of the computer hardware 210. Additionally, the virtualization layer 230 presents a guest OS 234 to the server application 238.

Figure 3:
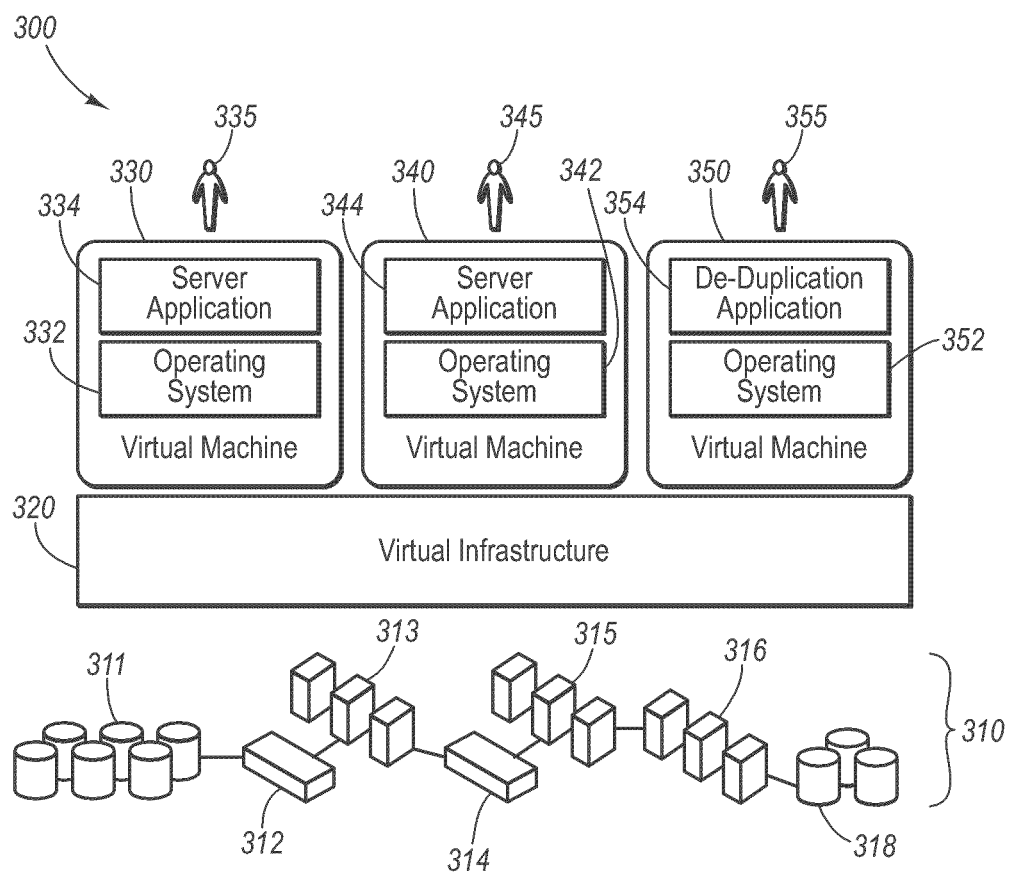
FIG. 3 depicts yet another virtualized server environment illustrating the use of a virtual infrastructure or layer to allow multiple virtual machines to access a computer resources pool that includes memory and storage.

FIG. 3 illustrates yet another embodiment of a virtualized system 300 according to the invention. The virtualized system 300 includes a computer resources pool or computer architecture/platform 310 that includes the hardware and associated software available in the system 300. The pool 310 includes primary storage 311, 318 that may include nearly any type of storage device for digital data such as disk devices. The pool 310 also includes networks/network devices 312, 314 and a number of physical servers or other computing devices 313, 315, 316 (which may also be used as data storage in some cases with storage 311, 318 being used additionally or alternately for archive or backup storage).

Upon the platform 310, a virtualization infrastructure 320 is provided for connecting the resources in pool 310 to users (or to a business/enterprise) 335, 345, 355. The virtual infrastructure 320 provides a dynamic mapping of the resources in pool 310 to one or more virtual machines 330, 340, 350. Each of the virtual machines 330, 340, 350 runs an OS 332, 342, 352 and an application 334, 344, 354. In the present embodiment of the invention, each of the applications 334 and 344 is a server application whose operation includes reading data into virtual memory from virtual storage and/or writing data into virtual storage from virtual memory.

The application 354 is a data de-duplication application that replaces redundant data in virtual memory and/or in virtual storage with a pointer or reference pointing to a single instance of the data. As previously discussed, this de-duplication process can occur in-line or post-process using a fixed or variable block size. Further, it can operate within a virtual machine 330 on the virtual infrastructure 320, as illustrated, or it can be installed and operated as a conventional application.

Advantageously, de-duplicating data in memory and/or storage increases the amount of available space in memory and/or storage since only a single instance of data is stored in memory and/or storage, respectively. As a result of this effective increase in size of memory, more data can be read into memory, thereby improving access speeds. Additionally, the amount of storage I/O is reduced since a greater amount of data is stored in memory. When data is de-duplicated in-line prior to being written to storage, less data is written to storage, which reduces processing overhead in storage such as a SAN, and the like. Additionally, a greater amount of data can be stored in the storage when the data is de-duplicated.

Figure 4:
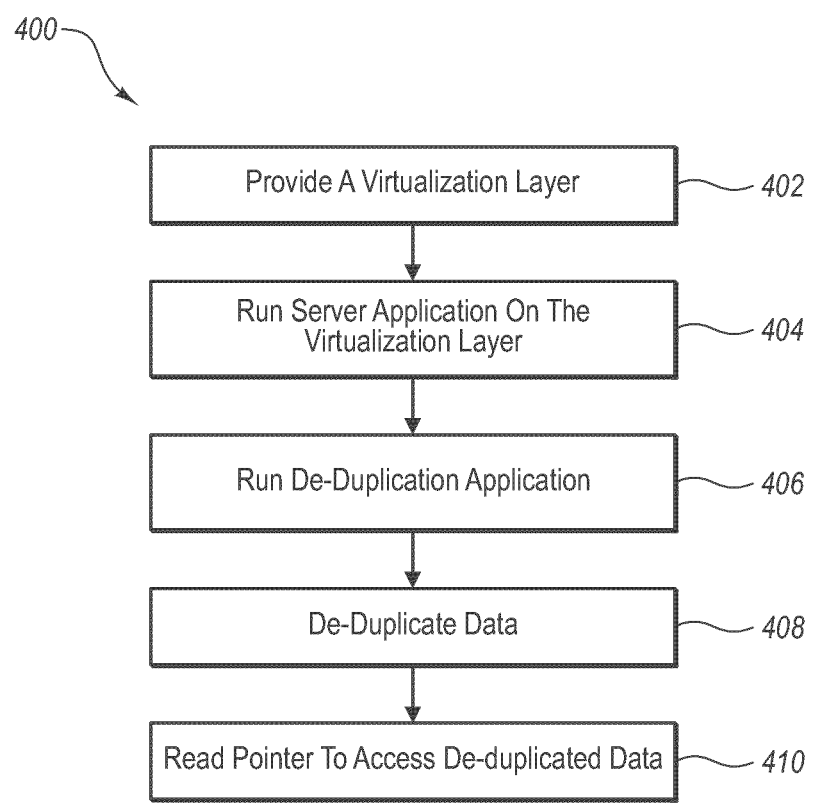
FIG. 4 depicts a method for de-duplicating redundant data in memory and storage of a computer architecture upon which one or more virtualized servers operate according to one embodiment of the invention.

With reference now to FIG. 4, a method 400 is illustrated for de-duplicating data in memory and/or storage of a computer architecture. A typical computer architecture in which the method 400 may be practiced includes one or more memory devices and one or more storage devices, wherein data can be read from storage into memory and/or can be written from memory to storage. The process 400 begins by providing 402 a virtualization layer on the computer architecture. One or more server applications can then be run or operated 404 on the virtualization layer, in the process of which the server application reads data into memory and writes data to storage. The virtualization layer presents a representation of at least a portion of the memory and at least a portion of the storage to the server application wherein data used by the server application can be stored.

A data de-duplication application can also be operated or run 406 on the virtualization layer or on the operating system of a physical host machine to de-duplicate redundant data in the memory and/or storage. When operated or run on the virtualization layer, the virtualization layer presents a representation of a set of components of the computer architecture to the de-duplication application such that the de-duplication application can de-duplicate redundant data.

Upon running the de-duplication application, the application de-duplicates 408 data in memory, storage, or both. Note that when de-duplicating data, the de-duplication application is configured to view the memory and storage as separate systems. Thus, if a single instance of data is stored in both memory and in storage, the de-duplication application does not eliminate one of the instances. Instead, the de-duplication application is configured to eliminate redundant data in memory relative only to the data stored in memory and/or to eliminate redundant data in storage relative only to the data in storage.

In one embodiment, de-duplicating 408 data includes identifying redundant data, deleting it, and replacing it with a pointer that points to a single instance of the deleted data. Although various methods and algorithms can be implemented according to the invention, in one embodiment identifying redundant data comprises breaking data into one or more pieces of a variable or fixed size, performing a hash on each piece to obtain a hash value, and comparing the resulting hash value to hash values for data already present in the system. If the de-duplication application implements a deterministic hash function that produces probabilistically unique hash values (e.g., SHA-1, MD5, and the like), then identical hash values indicate that the underlying data is identical. Additionally, hash values can be used as the references or pointers that point to single instances of data.

Returning to FIG. 4, the server application can access 410 de-duplicated data by reading the pointers, which refer the server application to the single instance of the data.

One skilled in the art will appreciate that data de-duplication according to the invention can be implemented across server application virtual machines operating on a single physical server (such as in FIGS. 1 and 2 but with a plurality of server applications), or across server application virtual machines operating across a plurality of physical servers (such as in FIG. 3).

As discussed above, the virtualization layer or infrastructure (such as those shown in FIGS. 1-3) may take a number of forms to practice the invention. In one embodiment, however, the server applications and optionally the de-duplication application may be run on VMware virtualization products such as VMware ESX or GSX (or similar products). Virtualization products such as VMware ESX are relatively well known and understood by those skilled in the art and a full discussion is not believed required here to describe the invention. In other embodiments, the virtualization layer is provided by the virtualization product Xen 3.0 (or other versions) from XenSource, and in other embodiments, virtualization products from Microsoft Corporation and/or Intel Corporation are used to provide the virtualization layer described herein.

The embodiments described herein may include the use of a special purpose or general-purpose computer including various computer hardware or software modules, as discussed in greater detail below.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired and wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the term "module" or "component" can refer to software objects or routines that execute on the computing system. The different components, modules, engines, and services described herein may be implemented as objects or processes that execute on the computing system (e.g., as separate threads). While the system and methods described herein are preferably implemented in software, implementations in hardware or a combination of software and hardware are also possible and contemplated. In this description, a "computing entity" may be any computing system as previously defined herein, or any module or combination of modulates running on a computing system.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for de-duplicating redundant data in memory, storage, or both, comprising:
    providing a virtual machine including a virtualization layer on a computer architecture comprising memory for temporarily storing data, and storage for persistently storing data, the virtualization layer presenting a representation of at least a portion of the memory and at least a portion of the storage to a server application;
    running the server application in the virtual machine on the virtualization layer, the server application reading data from the portion of the storage into the portion of the memory and writing data to the portion of the storage from the portion of the memory through the virtualization layer; and
    running a data de-duplication application on the computer architecture to de-duplicate data in the memory and in the storage of the computer architecture, wherein the data de-duplication application treats the memory and the storage as separate systems, and wherein the de-duplication application eliminates redundant data in the memory relative only to the data stored in the memory and eliminates redundant data in the storage relative only to the data stored in the storage.

2. The method of claim 1, wherein the memory comprises one or more of processor registers, cache memory, and random access memory and the storage comprises disk storage.

3. The method of claim 1, wherein de-duplicating data in memory comprises:
    identifying first data in memory that is identical to second data in memory;
    deleting the second data from memory; and
    replacing the second data with a pointer pointing to the identical first data.

4. The method of claim 3, wherein identifying first data in memory that is identical to second data in memory includes performing a hash function on each of the first and second data, comparing the resulting hash values for the first and second data to each other, and determining that the hash values are identical.

5. The method of claim 4, wherein the pointer pointing to the identical first data comprises the hash value of the second data.

6. The method of claim 1, wherein de-duplicating data in storage comprises:
    identifying first data in storage that is identical to second data in storage;
    deleting the second data from storage; and
    replacing the second data with a pointer pointing to the identical first data.

7. The method of claim 6, wherein identifying first data in storage that is identical to second data in storage includes performing a hash function on each of the first and second data, comparing the resulting hash values for the first and second data to each other, and determining that the hash values are identical.

8. The method of claim 7, wherein the pointer pointing to the identical first data comprises the hash value of the second data.

9. The method of claim 1, wherein the server application comprises a plurality of server applications, the virtualization layer presenting a representation of a separate portion of the memory and a separate portion of the storage to each of the server applications.

10. The method of claim 1, wherein running the data de-duplication application on the computer architecture comprises running the data de-duplication application on the virtualization layer.

11. The method of claim 1, wherein:
    the data de-duplication application de-duplicates data in memory either as the data is read into memory, or after the data has been read into memory; and
    the data de-duplication application de-duplicates data in storage either as the data is written to storage, or after the data has been written to storage.

12. The method of claim 1, wherein de-duplicating data in one or more of memory and storage comprises breaking the data into blocks, the size of the blocks being either fixed or variable.

13. A method for de-duplicating data in a computer environment including one or more virtualized server applications, the method comprising:
    providing a virtualization layer on a computer architecture that includes memory for temporarily storing data, and storage for persistently storing data;
    operating at least one server application in a virtual machine on the virtualization layer, the at least one server application configured to read data from storage into virtualized memory and to write data from memory to virtualized storage during operation through the virtualization layer which presents a virtualized representation of the computer architecture to the at least one server application, the virtualized representation including the virtualized memory and the virtualized storage;

operating a data de-duplication application on the computer architecture to perform :

identifying data read into the virtualized memory that is identical to data already stored in memory; and identifying data written to the virtualized storage that is identical to data already stored in storage; and replacing :

identical data read into the virtualized memory with one or more pointers pointing to the corresponding data already stored in memory of the computer architecture; and identical data written to the virtualized storage with one or more pointers pointing to the corresponding data already stored in storage of the computer architecture, wherein the data de-duplication of the memory is performed relative to the memory and the data de-duplication of the storage is performed relative to the storage, wherein the de-duplication application eliminates redundant data in the memory relative only to the data stored in the memory and eliminates redundant data in the storage relative only to the data stored in the storage, wherein the data de-duplication application is configured to de-duplicate the data across a plurality of virtual machines including the virtual machine.

14. The method of claim 13, wherein providing a virtualization layer on a computer architecture further comprises pooling resources of the computer architecture.

15. The method of claim 13, wherein the de-duplication application is encapsulated within a virtual machine running on the virtualization layer and wherein the virtualization layer presents a virtualized representation of the computer architecture to an operating system of the virtual machine.

16. The method of claim 13, wherein the computer architecture comprises one or more networks, one or more network devices, or one or more networks and one or more network devices and wherein virtualization layer comprises a virtual infrastructure that connects resources in the computer architecture to users and wherein the virtual infrastructure provides a dynamic mapping of the resources to a plurality of virtual machines.

17. The method of claim 16 wherein the at least one server application comprises a plurality of server applications, each server application being encapsulated within a different one of the plurality of virtual machines and wherein each of the plurality of virtual machines runs an operating system and wherein at least two of the operating systems are identical.

18. The method of claim 17, wherein operating the plurality of server applications includes reading the at least two identical operating systems from storage into memory, and wherein replacing identical data read into memory with one or more pointers pointing to the corresponding data already stored in memory comprises replacing at least one copy of the at least two identical operating systems read into memory with pointers to a single remaining copy of the at least two identical operating systems.

19. The method of claim 13, wherein identical data is replaced with one or more pointers either post-process or in-line.

20. The method of claim 13, further comprising accessing identical data no longer stored in memory, or storage, by using the one or more pointers to access the corresponding data already stored in memory, or storage, respectively.

* * * * *